Figure 1:
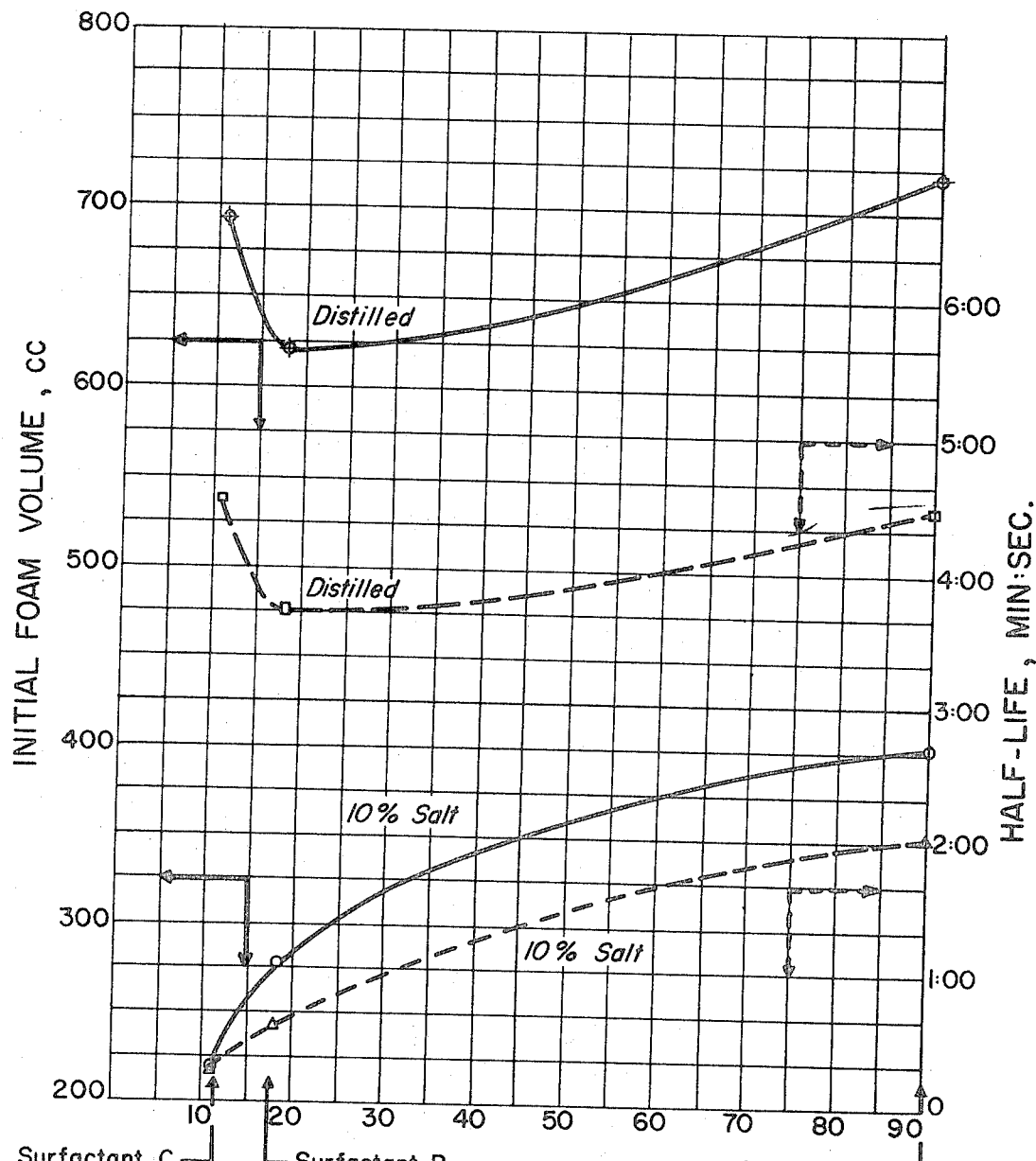

United States Patent [19]
Zika

[11] 3,746,096
[45] July 17, 1973

[54] SURFACTANT COMPOSITION

[75] Inventor: Harry T. Zika, South Charleston, W. Va.

[73] Assignee: Union Carbide Corporation, New York, N.Y.

[22] Filed: Oct. 31, 1969

[21] Appl. No.: 872,951

Related U.S. Application Data

[63] Continuation-in-part of Ser. No. 504,050, Oct. 23, 1965, abandoned.

[52] U.S. Cl. .................. 166/311, 175/69, 175/71, 252/8.5 C, 252/8.55 B, 260/458
[51] Int. Cl. ............................................ E21b 21/04
[58] Field of Search .................. 260/458; 252/8.5 C, 252/8.55 B; 166/311; 175/69, 71

[56] References Cited
UNITED STATES PATENTS

| | | | |
|---|---|---|---|
| 3,391,750 | 7/1968 | Zika | 252/8.5 X |
| 3,215,200 | 11/1965 | Kirkpatrick et al. | 252/8.55 X |
| 3,130,798 | 4/1964 | Schramm et al. | 252/8.5 X |
| 3,376,333 | 4/1968 | Ernst et al. | 260/458 |
| 2,644,831 | 7/1953 | Kosmin | 260/458 |
| 2,637,740 | 5/1953 | Kosmin | 260/458 |

OTHER PUBLICATIONS

Soft Detergent Intermediates, Article in Chemical Engineering, March 2, 1964, pages 54 and 56.

*Primary Examiner*—Herbert B. Guynn
*Attorney*—Paul A. Rose, Aldo J. Cozzi and Saul R. Bresch

[57] ABSTRACT

Secondary-n-undecanol ethoxysulfates containing from about 2.5 to about 6 ethyleneoxy units are excellent all-purpose foaming agents for air or gas drilling of wells. These compounds, in addition to their foaming ability, are fully biodegradable.

3 Claims, 2 Drawing Figures

INVENTOR
HARRY T. ZIKA

SURFACTANT COMPOSITION

This application is a continuation-in-part of application U.S. Pat. application Ser. No. 504,050, filed Oct. 23, 1965 now abandoned.

This invention relates to a novel surfactant composition. More particularly, this invention is concerned with an anionic surfactant composition having particular utility as a foamer for air or gas driling of wells.

The use of air and gas drilling techniques for drilling wells, such as oil or gas wells, recently has become a preferred technique in many parts of the country because of the higher permissible drilling speeds and resultant economic advantages over other techniques. An essential feature of the air or gas drilling technique is the use of a surfactant to remove water encountered down-hole as the drilling operation proceeds through water-bearing strata. Unless the water is removed, drill cuttings agglomerate, fouling the drill bit and causing seizure of the bit. Surfactants are employed to convert the water to a light foam column, which is readily removed by the air or gas stream and which permits the dirll cuttings to be blown out of the hole. The use of surfactants in this manner is more fully described in U.S. Pat. No. 3,130,798.

Water removal is complicated by a number of factors, with perhaps the most difficult problem being that of water salinity. To date, many of the surfactants marketed as foaming agents for air or gas drilling perform satisfactorily in water having a low saline content, generally less than about 5 to 10 weight percent dissolved salts, primarily sodium chloride. However, when waters of high salinity are encountered, these surfactants, apparently due to poor solubility in highly saline aqueous media, fail to provide satisfactory foaming. Conversely, although surfactants have been developed which are satifactory in a high saline environment, they frequently exhibit poor performance in low saline media. Finally, although some surfactants have been developed and marketed as "all-purpose" foamers, they have been of the more expensive cationic type, such as higher-alkyltrimethylammonium chlorides, and thus are generally uneconomical for use in the quantities normally required by air or gas drilling techniques. The only alternative, however, is to maintain a large inventory of various low-saline and high-saline foamers, and to periodically experiment as waters of differing salinity are encountered, itself an uneconomical practice.

It has been discovered by this invention that certain salts of $C_{11}$-secondary alkanol ethoxysulfates are excellent all-purpose foaming agents for air or gas drilling. The foaming agents of this invention are represented by the general formula:

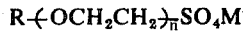

wherein R is a secondary n-undecyl radical, $n$ is a number having a value, including fractional values, of from about 2.5 to about 6, preferably from about 3.5 to about 5, and especially from about 3 to about 5, and $M$ is a monovalent cation having an atomic or molecular weight of up to about 150, including alkali metals such as sodium, potassium and lithium, the ammonium ion or substituted ammonium ions, particularly alkyl- and hydroxyethyl-ammonium ions. More particularly M is an organic ammonium ion especially a 1 to about 5 carbon atoms alkyl-ammonium ion and preferably a hydroxyalkyl, dihydroxyalkyl or trihydroxyalkyl-ammonium ion having from 1 to about 5 carbon atoms such as hydroxyethyl-ammonium, dihydroxyethyl-ammonium and trihydroxyethyl-ammonium ions and mixtures thereof.

These alcohol ethoxysulfates can be pure compounds, but normally are mixtures, and can be produced by the reaction of a secondary-n-undecanol with ethylene oxide, followed by sulfation of the ethoxylate and neutralization of the alkyl-sulfuric acid, all known techniques. The secondary-n-undecanol can be a pure isomer, but is especially a mixture of all possible secondary isomers, such as is produced by the air oxidation of n-undecane. Preferably the secondary n-undecyl radical R may be substituted by $-(OCH_2CH_2)_n$ or any secondary carbon atom in the radical R in a substantially uniform random manner i.e., substitution wherein a mixture of isomers of substituted radicals R does not contain one isomer of the mixture in a proportion substantially greater than any other isomer.

Figure 2:
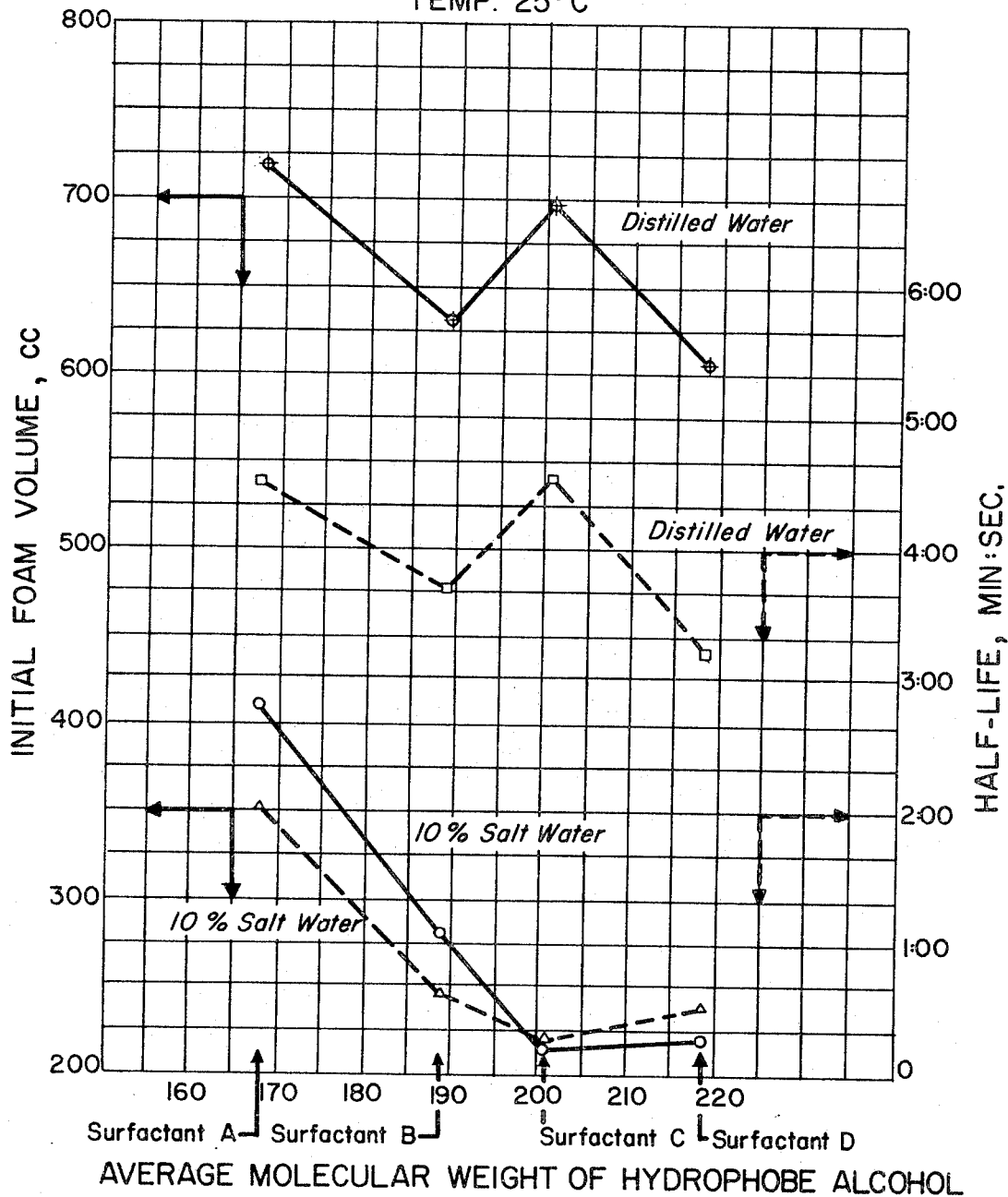

The advantages of the invention are also illustrated graphically in the attached drawings in which:

FIGS. 1 and 2 illustrate the advantages of the present invention compared to other similar compounds containing secondary $C_{11}$ alkyl groups regarding foam volume and half life of the foam. In FIGS. 1 and 2 a comparison has been made with various surfactants as to initial foam volume and half life, employing the method further described in the examples. All surfactants are the ammonium sulfate salts of the ethoxylation products of uniformly random secondary alkyl alcohols. Surfactant A is made from such an alcohol containing a mixture of about 89.8 wt. % $C_{11}$ alcohols and about 7.2 wt. % $C_{12}$ alcohols the mixture having an average molecular weight of about 168 and contains an average of about 3.3 ethoxylate groups. Surfactant B is made from such an alcohol containing a mixture of about 18.0 wt. % $C_{11}$ alcohols, about 45 wt. % $C_{12}$ alcohols, about 37 wt. % $C_{13}$ alcohols the mixture having an average molecular weight of about 189 and contains an average of about 3 ethoxylate groups. Surfactant C is made from such an alcohol containing a mixture of about 10.8 wt. % $C_{11}$ alcohols, about 27.0 wt. % $C_{12}$ alcohols, about 22.2 wt. % $C_{13}$ alcohols, about 28.0 wt. % $C_{14}$ alcohols, about 12.0 wt. % $C_{15}$ alcohols, said mixture having an average molecular weight of about 201 and contains an average of about 3 ethoxylate. Surfactant D is made from such an alcohol containing a mixture of about 70 wt. % $C_{14}$ alcohols, about 30 wt. % $C_{15}$ alcohols said mixture having an average molecular weight of about 218 and contains an average of about 3 ethoxylate groups.

In normal use the surfactant is supplied to the driller in aqueous solution. The concentration of the surfactant in the aqueous solution is not highly critical, but normally ranges from about 50 to about 75 weight percent. At lower concentrations there is a danger of freezing the composition under atmospheric conditions extant at the wellhead, as well as the economic disadvantage of transporting a high water content product. At higher concentrations than about 75 percent, the surfactant may not remain in solution or may form a highly viscous mixture or even a slurry. If desired, the aqueous solution may contain other additives, such as foam boosters and the like, although they are ordinarily unnecessary. In use, the solution is diluted with water at the well head to provide a solution having the desired viscosity and then pumped into the well by known techniques, such as the process of U.S. Pat. No. 3,130,798.

3

The surfactant of this invention is not limited in its utility to air or gas drilling alone, and it is also useful in the unloading of existing wells; i.e., to aid in the removal of water which has seeped into an existing bore hole, by the use of compressed air or gas.

The surfactants of this invention have an additional desirable property, in addition to their good foaming ability. Because they have a linear alkyl group as the hydrophobic moiety, they are completely biodegradable, both in disposal plants and in naturally occurring environments. Because most surfactants presently employed as foaming agents are not biodegradable to a significant degree, and are accordingly liable to increasing regulation in their use, the provision of a biodegradable all-purpose foamer is an outstanding advantage of this invention.

The following examples are illustrative. In these examples all of the compounds produced comprising undecanol ethoxy sulfates and the salts thereof are produced by the air-oxidation of undecane followed by ethoxylation sulfonation and conversion to the ammonium salt unless otherwise indicated. In the examples, the various surfactants or mixtures thereof were tested by the following procedures:

1. Foam Volume - (A measure of total foaming ability) - The sample to be evaluated (0.5 milliliter if liquid and 0.5 gram if solid) was dissolved in 99.5 milliliters of distilled or salt water. In most instances, 1 milliliter of Gulf Security Oil, without additives, was added to simulate seepage of oil into gas wells, a factor normally adversely affecting foaming. The resulting formulation was charged to a graduated glass mixing jar, and then vigorously stirred for 30 seconds using a Waring Blendor. The initial foam volume, in cubic centimeters, was determined immediately by reading the top of the main body of the foam, including the lower liquid layer, if any, but disregarding large bubbles which may appear above the compact foam.

2. Half-Life -(A measure of foam stability) - The half-life is the time in minutes required for one-half of the formulation, i.e., 50 milliliters of liquid, to layer out of the foam. In cases in which a small amount of foam is generated, the line of demarcation between liquid and foam appears within 2 or 3 seconds after subsidence of the turbulence, and the liquid volume is well over the 50 milliliter calibration mark. In such instances, the half-life is reported as nil.

EXAMPLE 1

To a 2-gallon autoclave were charged 695 grams of crude secondary-n-undecanol* (*Analysis) and 2.0 grams of boron trifluoride-ethyl etherate (50 percent boron trifluoride). After pressuring several times with nitrogen to remove air and moisture, the vessel was sealed, heated to 60°–63°C. and 338 grams of ethylene oxide was fed while maintaining the pressure at 10–15 psig above autogenous pressure. After maintaining the reaction mixture at 60°–63°C. for 45 minutes after the addition of ethylene oxide, the reactor was cooled to room temperature and the reaction product transferred to a 3-liter, steam-jacketed, glass-lined, stirrer-equipped reactor. The mixture was washed with an equal volume of 1.5

| Component | Wt. % |
|---|---|
| Light ends | 0.06 |
| $C_{10}$ Pariffin | 0.17 |
| $C_{10}$ Ketone | 0.03 |
| $C_{11}$ Ketone | 0.97 |
| $C_{11}$ sec-Alcohol | 89.75 |
| $C_{12}$ Ketone | 0.05 |
| $C_{12}$ sec-Alcohol | 7.19 |
| $C_{15}$ Paraffin | 1.57 |
| $C_{16}$ Paraffin | 0.21 | percent aqueous sodium hydroxide at 90°–95°C. to neutralize the acid catalyst, and then washed twice with equal volumes of water. After decantation of the wash water, the product was stripped of residual water by heating at 80°–90°C. for 1 hour at 3–10 mm Hg. The dried product was charged to a 10-tray, 2-inch diameter Oldershaw column and unreacted undecanol was removed by vacuum distillation at a 1:1 reflux ratio until the specific gravity of the distillate was 0.860. The residue product, which weighed 326 grams, had an average molecular weight of 326, representing an ethoxylate containing an average of 3.3 ethyleneoxy ($-CH_2CH_2O-$) units which were distributed along the secondary carbon atoms of the undecyl radical in a substantially uniform and random way.

A 163-gram portion of the ethoxylate was charged to a 1-liter reactor, and 75 grams of finely pulverized sulfamic acid were added. After purging the system with nitrogen, the reaction mixture was heated at 112°–116°C., with stirring and under a slight nitrogen purge, for 1.5 hours. The product was cooled to 75°C., and a 150-gram portion was dissolved in 65 grams of distilled water, 35 grams of ethanol and 1 gram of ammonium hydroxide. An additional 0.8 milliliter of ammonium hydroxide was added to adjust the pH to 8.0.

The product, ammonium sec-n-undecanol ethoxysulfate, having ethoxy sulfate groups substantially uniformly and randomly distributed along the secondary carbon atoms of the undecyl radical, was evaluated as a foamer in salt and fresh water containing 1 percent oil, with the following results.

TABLE I

| Medium | Foam Volume, cc | Half-life, min. |
|---|---|---|
| Distiller water | 720 | 4.48 |
| Salt water | 410 | 2.03 |

EXAMPLE 2

Employing procedures similar to those described in Example 1, an ammonium sec-n-undecanol ethoxysulfate containing an average of 4.3 ethyleneoxy units was prepared and evaluated both in fresh and salt water with and without added oil. The results of these evaluations are:

TABLE II

| Medium | Foam Volume, cc | Half-life, min. |
|---|---|---|
| Distilled water | 695 | 4.23 |
| Distilled water & oil | 695 | 4.48 |
| Salt water | 455 | 2.20 |
| Salt water & oil | 445 | 2.23 |

EXAMPLE 3

A series of experiments were conducted in distilled and salt water containing oil to determine the optimum ethyleneoxy content of the undecanol ethoxysulfate. The ammonium salt of a uniformly random undecanol ethoxy sulfate was used and the results of these experiments are summarized in Table III.

TABLE III

| Av. No. of ethyleneoxy Units | Distilled Water | | Salt Water | |
|---|---|---|---|---|
| | Foam vol. cc | Half-life min. | Foam vo. cc | Half-life min. |

| 1.6 | 4.80 | 725 | 235 | 0.17 |
| 2.8 | 4.45 | 710 | 400 | 1.17 |
| 3.3 | 4.48 | 720 | 410 | 2.03 |
| 4.3 | 4.48 | 695 | 445 | 2.23 |
| 6.0 | 3.87 | 600 | 4.20 | 1.87 |

EXAMPLE 4

A second series of experiments was conducted to determine the effect of variations in the carbon number spread or average molecular weight of the secondary-n-alkyl hydrophobe in the performance of 3-mole, 4.3 mole and 4.6 mole ethoxysulfates, employing distilled or salt water containing added oil. The ammonium salt of the ethoxy sulfates is used, the results being summarized in Table IVA and IVB.

TABLE IVA

| Hydro-phobe | Distilled Water Foam volume cc | Half-life min. | Salt Water Foam volume cc | Half-life min. |
|---|---|---|---|---|
| A | 720 | 4.48 | 410 | 2.03 |
| B | 630 | 3.68 | 280 | 0.6 |
| C | 695 | 4.52 | 210 | 0.25 |

A — sec-n-undecyl — same as alkyl group of Surfactant A in FIGS. 1 and 2, 3 moles ethoxysulfate.
B — $C_{11}$-$C_{13}$ sec-n-alkyl — same as alkyl group of Surfactant B in FIGS. 1 and 2, 3 moles ethoxysulfate.
C — $C_{11}$-$C_{15}$ sec-n-alkyl — same as alkyl group of Surfactant C in FIGS. 1 and 2, 3 moles ethoxysulfate.

TABLE IVB

| Hydro-phobe | Dist. Water Foam vol. cc | Half-life min. | 10% Salt Water Foam vol. cc | Half-life min. |
|---|---|---|---|---|
| AA | 695 | 4.48 | 445 | 2.23 |
| CC | 690 | 4.10 | 375 | 1.33 |

AA — sec-n-undecyl 4.3-mole ethoxysulfate — same as alkyl group of Surfactant A of FIGS. 1 and 2.
CC — $C_{11}$ to $C_{15}$ sec-n-alkyl 4.6-mole ethoxysulfate — same as alkyl group of Surfactant C of FIGS. 1 and 2.

EXAMPLE 5

For purposes of comparison, a series of experiments was conducted in distilled water or salt water media, each containing oil, to evaluate representative products which are presently commercially available. These results are summarized in Table V, with the data for the surfactant of this invention (Example 2) being included to simplify comparison.

TABLE V

| Surfactant | Distilled Water Foam vol. cc | Half-life min. | Salt Water Foam Vol. cc | Half-life min. |
|---|---|---|---|---|
| Nonionic | | | | |
| Afrox 200 | 280 | 1.52 | 340 | 2.55 |
| Cationic | | | | |
| La-Cal LC-400 | 450 | 2.22 | 225 | 0.72 |
| Magcofoam 33 | 240 | 0.42 | 200 | nil |
| Westco Foaming Additive | 380 | 2.88 | 420 | 3.50 |
| Anionic | | | | |
| Adafoam 50 | 535 | 2.45 | 345 | 1.48 |
| O.K. Liquid | 460 | 2.65 | 210 | 0.63 |
| Synfoam No. 2 | 575 | 3.10 | 1.95 | nil |
| This Invention | 695 | 4.48 | 445 | 2.23 |

Adafoam 50 — An admixture of an anionic (sulfate) surfactant and an amide foam booster manufactured by Continental Oil Co., and marketed as an all-purpose foamer.
Afrox 200 — A nonionic alkanol-ethylene oxide adduct manufactured by the Baroid Division of National Lead Co. and marketed primarily as a high saline foamer.
La-Cal LC-400 — A cationic surfactant manufactured by La Cal Mud Co. and marketed as an all-purpose foamer.
O.K. Liquid — An admixture of a modified ammonium alkyl sulfate (anionic) surfactant and an organic builder manufactured by Procter & Gamble Corp. and marketed primarily as a low saline foamer.
Synfoam No. 2 — An anionic surfactant manufactured by Swift & Co. and marketed primarily as a saline foamer.
Westco Foaming Additive — A cationic surfactant manufactured by Westco, Inc. and marketed as an all-purpose foamer.

In general, a good foamer should provide a foam volume of at least about 400 cubic centimeters with a half-life of at least about 3 minutes in distilled water and a foam volume of at least about 300 cubic centimeters with a half-life of at least about 2 minutes in 10 percent salt water. To emphasize the superiority of the composition of this invention over the commercially available foamers, the data of Table V is retabulated in Table VI as ratios of the observed data to these base criteria.

TABLE VI

| Surfactant | Distilled Water Foam Vol. | Half-life | Salt Water Foam Vol. | Half-life |
|---|---|---|---|---|
| Nonionic | | | | |
| Afrox 200 | 0.70 | 0.51 | 1.13 | 1.28 |
| Cationic | | | | |
| La-Cal Lc-400 | 1.13 | 0.74 | 0.75 | 0.36 |
| Magcofoam 33 | 0.60 | 0.14 | 0.67 | 0 |
| Westco Foaming Additive | 0.95 | 0.96 | 1.40 | 1.75 |
| Anionic | | | | |
| Adafoam 50 | 1.34 | 0.82 | 1.15 | 0.74 |
| O.K. Liquid | 1.15 | 0.88 | 0.70 | 0.32 |
| Synfoam No. 2 | 1.44 | 1.03 | 0.65 | 0 |
| This Invention | 1.74 | 1.49 | 1.48 | 1.11 |

As is readily seen, few of the commercially available foamers for air or gas drilling have good activity in both low- and high-saline media, and none of them have the superior over-all foaming ability and foam stability possessed by the surfactant of this invention.

I claim:

1. In the method for removing water present in a well bore, comprising forcing said water out of said bore with air or gas at elevated pressure and employing a surfactant to assist in the removal of said water by forming an aqueous foam in said well bore, the improvement of injecting in said well bore as said surfactant a composition of the formula:

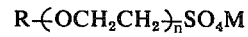

$$R \text{-} (OCH_2CH_2)_n SO_4 M$$

wherein R is sec-n-undecyl, $n$ is a number having a value of from about 2.5 to about 6 and M is a monovalent cation having a molecular weight of up to about 150.

2. The method as claimed in claim 1 wherein n has a value of from about 3 to about 5 and M is selected from the group consisting of alkali metal and ammonium cations.

3. The method as claimed in claim 2 wherein M is ammonium.

* * * * *

UNITED STATES PATENT OFFICE
CERTIFICATE OF CORRECTION

Patent No. 3,746,096     Issue Date  July 17, 1973

Inventor(s) H. T. Zika

It is certified that error appears in the above-identified patent and that said Letters Patent are hereby corrected as shown below:

Column 1, line 8, "driling" should be --drilling--.

Column 1, line 22, "dirll" should be --drill--.

Columns 4-5, Table III should appear as follows:

TABLE III

| Av. No. of Ethyl- eneoxy Units | Distilled Water | | Salt Water | |
|---|---|---|---|---|
| | Foam Vol. cc | Half-Life min. | Foam Vo. cc | Half-Life min. |
| 1.6 | 725 | 4.80 | 235 | 0.17 |
| 2.8 | 710 | 4.45 | 400 | 1.17 |
| 3.3 | 720 | 4.48 | 410 | 2.03 |
| 4.3 | 695 | 4.48 | 445 | 2.23 |
| 6.0 | 600 | 3.87 | 420 | 1.87 |

Column 5, Table V - fourth column of table, "1.95" should be --19!

Signed and sealed this 29th day of January 1974.

(SEAL)
Attest:

EDWARD M. FLETCHER, JR.
Attesting Officer

RENE D. TEGTMEYER
Acting Commissioner of Patents